US011224917B1

(12) United States Patent
Rogren

(10) Patent No.: US 11,224,917 B1
(45) Date of Patent: Jan. 18, 2022

(54) MULTI-MATERIAL THREE-DIMENSIONAL PRINTER WITH UNDERLYING ADJUSTABLE BINDER

(71) Applicant: Sakuu Corporation, San Jose, CA (US)

(72) Inventor: Philip Eugene Rogren, Half Moon Bay, CA (US)

(73) Assignee: Sakuu Corporation, San Jose, CA (US)

(*) Notice: Subject to any disclaimer, the term of this patent is extended or adjusted under 35 U.S.C. 154(b) by 0 days.

(21) Appl. No.: 17/392,727

(22) Filed: Aug. 3, 2021

Related U.S. Application Data

(62) Division of application No. 17/218,756, filed on Mar. 31, 2021.

(51) Int. Cl.
| | |
|---|---|
| *B22F 10/14* | (2021.01) |
| *B22F 12/55* | (2021.01) |
| *B22F 10/30* | (2021.01) |
| *B22F 12/57* | (2021.01) |
| *B33Y 30/00* | (2015.01) |
| *B22F 12/33* | (2021.01) |
| *B33Y 50/02* | (2015.01) |
| *B33Y 10/00* | (2015.01) |

(Continued)

(52) U.S. Cl.
CPC .............. *B22F 10/14* (2021.01); *B22F 10/28* (2021.01); *B22F 10/30* (2021.01); *B22F 12/33* (2021.01); *B22F 12/55* (2021.01); *B22F 12/57* (2021.01); *B29C 64/165* (2017.08); *B33Y 10/00* (2014.12); *B33Y 30/00* (2014.12); *B33Y 50/02* (2014.12)

(58) Field of Classification Search
None
See application file for complete search history.

(56) References Cited

U.S. PATENT DOCUMENTS

| | | |
|---|---|---|
| 10,723,147 B2 | 7/2020 | Pervan et al. |
| 10,800,186 B2 | 10/2020 | Pervan et al. |

(Continued)

OTHER PUBLICATIONS

Non-Final Rejection, dated Jun. 18, 2021 (from parent U.S. Appl. No. 17/218,756) (Year: 2021).*

(Continued)

*Primary Examiner* — Colin W. Slifka
(74) *Attorney, Agent, or Firm* — NovoTechIP International PLLC

(57) ABSTRACT

A jetted binder printing system includes a carrier substrate configured to travel along a longitudinal direction thereof, an adjustable binder printer configured to deliver an adjustable binder to the carrier substrate, a dispensing module located downstream from the adjustable binder printer on the longitudinal direction of the carrier substrate, the dispensing module including at least one powder container, the dispensing module being configured to dispense powder onto the carrier substrate, and a primary binder printer located downstream from the compaction module along the longitudinal direction of the carrier substrate. The primary binder printer includes a print head configured to print a primary binder on the dispensed powder according to a desired pattern. The primary binder is printed on a surface of the powder that is opposite a surface on which the adjustable binder is printed. The primary binder is printed to match the pattern of the adjustable binder.

14 Claims, 7 Drawing Sheets

(51) Int. Cl.
*B22F 10/28* (2021.01)
*B29C 64/165* (2017.01)

(56) References Cited

U.S. PATENT DOCUMENTS

2012/0163553 A1 6/2012 Deych et al.
2019/0134713 A1 5/2019 Abbott, Jr. et al.
2019/0375159 A1 12/2019 Rogren et al.

OTHER PUBLICATIONS

Interview Summary, dated Aug. 27, 2021 (from parent U.S. Appl. No. 17/218,756) (Year: 2021).*

* cited by examiner

MULTI-MATERIAL THREE-DIMENSIONAL PRINTER WITH UNDERLYING ADJUSTABLE BINDER

CROSS REFERENCE TO RELATED APPLICATION

This application is a divisional application of U.S. patent application Ser. No. 17/218,756 entitled "MULTI-MATERIAL THREE-DIMENSIONAL PRINTER WITH UNDERLYING ADJUSTABLE BINDER," filed Mar. 31, 2021, the entirety of which is hereby incorporated by reference.

TECHNICAL FIELD

This application relates to three-dimensional (3D) printing using jetted binder printers, particularly to the application of an adjustable binder to the carrier substrate prior to powder deposition.

BACKGROUND

Three-dimensional (3D) printing has generated a high degree of interest in the potential for a faster and more economical manufacturing approach. Today, the majority of 3D printers are used to make demonstration parts or non-functional prototypes, most from a plastic material that is chosen primarily for compatibility with the printer rather than the materials requirement of the final part. Among the issues hampering a wider acceptance of 3D printing as a commercially viable manufacturing method is the requirement of specific applications for specific materials compatible with these applications.

The most common 3D printing techniques typically create a patterned 3D object by stacking patterned layers that are directly patterned on previously created layers. This approach has advantages in simplifying the 3D object creation process by generally not requiring manipulation of the patterned layers between, e.g., the pattern generation step and the assembly step. Additionally, in powder bed-based processes, in situ pattern generation facilitates the creation of the first layer of powder and allows the first patterned layer to be on a bed of several layers of powder that are confined by a build box. Generating a controlled and stable layer of fine powder on a necessarily smooth surface is typically difficult because the powder may be easily displaced by smoothing or otherwise conditioning the loose powder layer. Powder that is stabilized by a uniform bed of powder below it and the confinement of the build box can be more uniform and stable.

Disadvantages of in situ creation of patterned layers presents many problems that may limit the capabilities of powder bed-based 3D printers. The limitations of in situ build include, e.g., being limited to a single material to avoid cross-contamination, an inability to condition the powder layer to obtain desired and consistent density of the powder layer, the inability to use more than a single pattern generation method to optimize layer thickness and feature precision, and an inability to reject or correct a defective layer before it is incorporated into the complete printed part. Methods that allow for the separation of the pattern generation step and assembly step may be advantageous by avoiding the above disadvantages. Implementing an adjustable binder layer may allow to create a stable, uniform and transferrable layer of patterned powder directly on a carrier substrate.

SUMMARY

In one general aspect, the instant application describes a jetted binder printing system that includes a carrier substrate configured to travel along a longitudinal direction thereof, an adjustable binder printer configured to deliver an adjustable binder to the carrier substrate; a dispensing module located downstream from the adjustable binder printer on the longitudinal direction of the carrier substrate, the dispensing module including at least one powder container, the dispensing module being configured to dispense powder onto the carrier substrate; a compaction module located downstream from the dispensing module along the longitudinal direction of the carrier substrate, the compaction module being configured to apply a controlled pressure, in a direction substantially orthogonal to the longitudinal direction of the carrier substrate, to increase a compaction of the dispensed powder to a desired compaction range; and a primary binder printer located downstream from the compaction module along the longitudinal direction of the carrier substrate, the primary binder printer including a print head configured to print a primary binder on the dispensed powder according to a desired pattern; wherein the primary binder is printed on a surface of the powder that is opposite a surface on which the adjustable binder is printed; and wherein the primary binder is printed to match the pattern of the adjustable binder.

The above general aspect may include one or more of the following features. For example, the adjustable binder is compatible with the primary binder, is configured to maintain a position of the powder, or is configured to provide adhesion to the powder and to the primary binder.

For another example, the jetted binder printer system further includes a fusion module positioned downstream from the primary binder printer along the longitudinal direction of the carrier substrate, the fusion module including an energy source and being configured to cause selective fusion of the material layer according to the desired pattern; a material removal module positioned downstream from the fusion module along the longitudinal direction of the carrier substrate, the material removal module including a plurality of material removal devices and being configured to remove non-fused portions of the material layer to form one or more patterned single-layer objects; a transfer module located downstream from the material removal module along the longitudinal direction of the carrier substrate, the transfer module configured to transfer one of the patterned single-layer objects from the carrier substrate to an assembly plate; an assembly station comprising the assembly plate, the patterned single-layer objects being assembled into a stack on the assembly plate according to a desired sequence of objects including the patterned single-layer objects; and a controller to control the desired sequence and desired patterns.

For a further example, the carrier substrate is a belt, or further includes an adhesion control layer on which the material layer is formed, and the dispensing module includes one or more powder containers configured to contain a fluidized powder in a desired controlled condition.

As an additional example, the dispensing module includes one or more dispensing controllers configured to meter a desired amount of powder dispensed onto the carrier substrate, the dispensing rollers being configured to spread the powder on the carrier substrate, and the compactor module includes a vibratory energy source to cause settling of the powder.

For another example, the assembly station further includes a lateral positioner to laterally displace the assembly plate, and a vertical positioner to vertically displace the assembly plate, and the carrier substrate includes a fiducial marker for each of the patterned single-layer objects; and the assembly station comprises an alignment sensor to align the fiducial markers to the assembly plate.

In another general aspect, the instant application describes a method of manufacturing a three-dimensional object includes dispensing an adjustable binder on a longitudinal surface of a carrier substrate according to a desired pattern; dispensing a powder on the adjustable binder on the carrier substrate; compacting the powder to a desired compaction range; dispensing a primary binder on the compacted powder according to the desired pattern; selectively fusing the compacted powder according to the desired pattern; and removing non-fused portions of the compacted powder to form one of a patterned single-layer object.

The above general aspect may include one or more of the following features. For example, the method further includes transferring the patterned single-layer object from the carrier substrate to an assembly plate; and repeating the dispensing the adjustable binder, the dispensing the powder on the adjustable binder, the compacting the powder, the dispensing the primary binder, the selectively fusing the compacted powder and the removing the non-fused portions, to form a patterned multi-layer object.

For another example, dispensing the adjustable binder comprises defining a position of the powder, and dispensing the powder includes adhering the powder to the adjustable binder at the defined position.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Additional advantages and novel features of these various general aspects will be set forth in part in the description that follows, and in part will become more apparent to those skilled in the art upon examination of the following or upon learning by practice of the invention.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

3D printing presents a technical problem where the ability to deposit relatively thick layers, limits its usefulness when precise thin layers are needed, and there typically is a lack of precision in the deposition location of the powder. To address these technical problems and more, in an example, this description provides a technical solution for 3D jetted binder printers that are designed to create printed objects, printed layers and printed parts using combinations of materials and processes not typically associated with jetted binder printing.

A basic process for manufacturing a 3D printed part typically may begin, e.g., with a CAD file fully defining the structure, materials and specifications of the desired part. The part described in the CAD file may be sliced into print pattern layers, the thickness of each layer determined by specifications for each position within the printed part, such as final thickness and pattern tolerance. Each layer may then be separated into regions, which may require different materials. Printer control instructions for each of the regions of different material requirement may then be transferred from the design file via input device and central processing unit and interface bus to appropriate print station control units of the jetted binder printer system. As used herein, a "printed part" includes any assemblage of printed subparts or layers which may be fused together to form the part. Such an assemblage may be referred to as a "printed part" before or after fusing together its constituent parts. As used herein, a "printed layer" includes a layer of one or more materials, one voxel thick, which may have a horizontal design conforming to a design of a desired location within a desired printed part. In an implementation, a voxel is an array of elements of volume that constitute a notional three-dimensional space.

Figure 1:
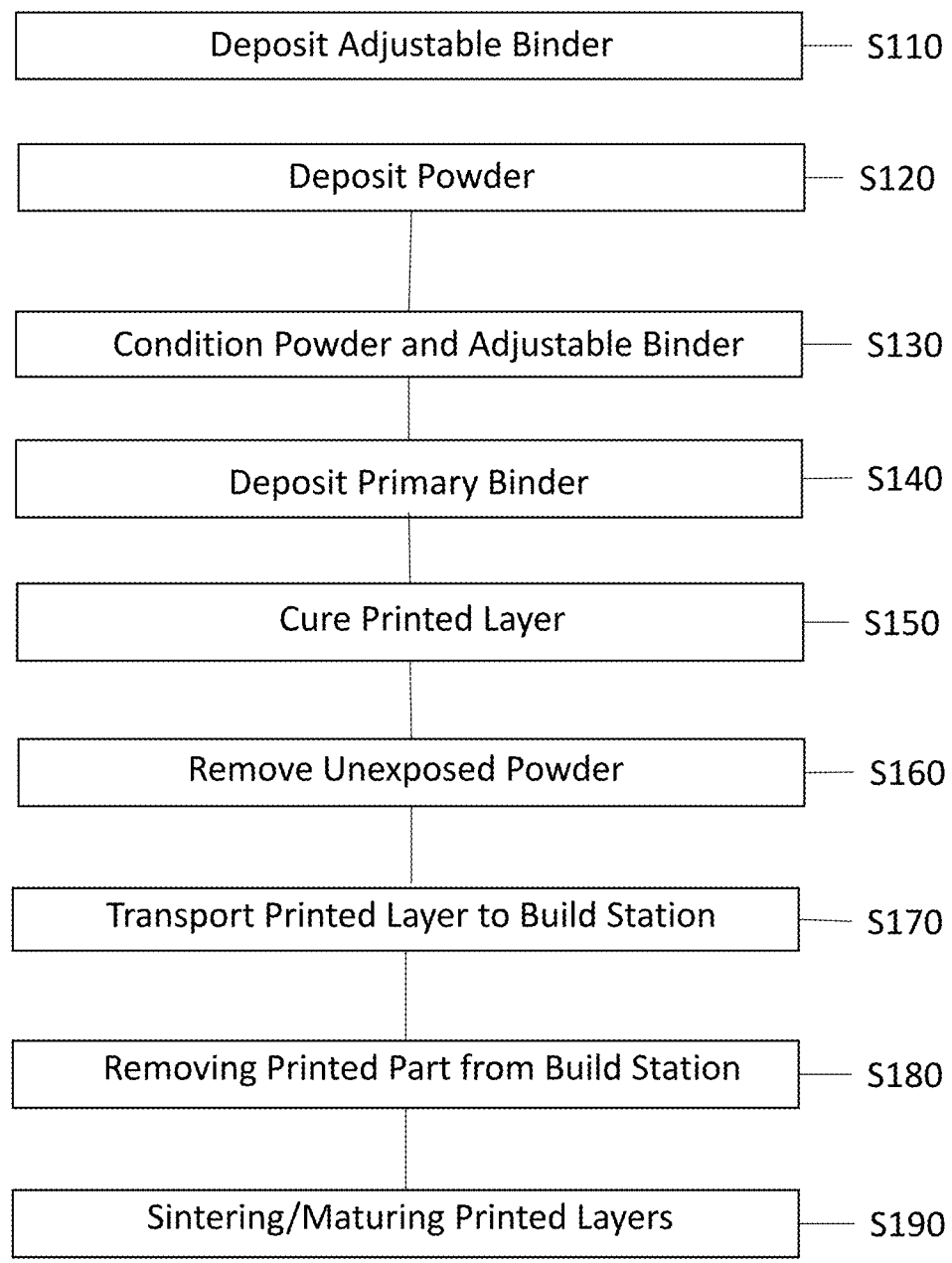
FIG. 1 is a flow chart illustrating a process for 3D inkjet printing, according to various implementations.

FIG. 1 is a flow chart illustrating a process for 3D jetted binder printing, according to various implementations. The method starts at S110, where an adjustable binder is deposited on a carrier substrate. For example, the adjustable binder is deposited on the carrier substrate while the carrier substrate is in movement via, e.g., a first inkjet print head. In various implementations, prior to powder deposition/recoat/conditioning, a layer of an adjustable binder material may be deposited on the carrier substrate via, e.g., ink jetting, in the same or exact pattern of the printed object. The adjustable binder may be treated to prepare for deposition of the powder thereon via, for example, exposure to a radiation source to modify the viscosity of the deposited layer of adjustable powder, or incorporating a reactive material in the deposited layer to modify the flow characteristics of the deposited layer.

Once the adjustable binder is deposited on the carrier substrate, at S120, the method deposits a powder or powder layer onto the adjustable binder that is deposited on the carrier substrate using, e.g., a powder dispenser. Powder may be metered onto the entire active area of the carrier substrate in an amount calculated to uniformly cover the active area with powder that will result in a desired thickness of powder after the conditioning step. The amount of adjustable binder deposited in the previous step may be sufficient to wet all the powder deposited, or it may be enough adjustable binder to wet only a lower portion of the deposited powder. The adjustable binder/powder composite may be designed to form a temporary bond between the adjustable binder/powder composite and the carrier substrate in order to maintain the as-deposited position of the adjustable binder/powder composite during subsequent operations, until the printed object is released from the carrier substrate and joined to a printed part.

At S130, both the deposited powder and the adjustable binder are conditioned in order to increase the density of the powder. For example, the powder may be conditioned by compacting to a predetermined density with a device such as a pressure cuff, by exposure to an energy source such as e.g., UV, IR, X-ray, or by exposure to particles such as, e.g., electrons.

At S140, a primary binder is deposited on the powder to e.g., form a patterned layer. After the powder has been deposited on the adjustable binder, recoated and conditioned, the primary binder deposition device may deposit the primary binder in precise alignment with the underlying powder and adjustable binder. For example, the volume of the adjustable binder may be select to be sufficient to stabilize and hold the powder in place, but not sufficient to fully wet the powder and provide an adhesive surface for the attachment to a subsequent layer. In that case, the primary binder simply wets the top, unwet layer of powder to provide uniform binding action throughout the powder layer in both the adjustable binder and the primary binders are formulated to readily wet the powder.

In various implementations, the adjustable binder may be or include the same material as the primary binder, or it may be or include a different but compatible material. For example, the adjustable binder and the primary binder may not adversely react, e.g., chemically react with each other to deteriorate each other, or to deteriorate the powder that is sandwiched between the adjustable binder and the primary binder. Furthermore, the primary binder and the adjustable binder may also be compatible during the sintering process, e.g., with respect to burn-out rates characteristics such that they do not interact destructively during the sintering process. The primary binder and the adjustable binder may also be compatible with the same sintering atmosphere such that one or the other or both do not leave unacceptable or deleterious contaminates behind after the sintering process of the powder and binders is complete. The adjustable binder layer may be a thin layer, mostly interacting or adhering with the bottom layer of powder particles. In implementations, the adjustable binder may be the sole binder consolidating the printed object.

In various implementations, a material of the adjustable binder may be selected to be adjustable in terms of adhesion strength by a form of energy exposure, i.e., the adhesion of the adjustable binder to the overlaying powder may be adjusted by exposing the adjustable binder to irradiation such as, e.g., heat. The adjustment in the adhesion of the adjustable binder may be performed to provide a desired adhesion of the adjustable binder to the carrier, the adhesion of the adjustable binder to the powder, or the adhesion of the adjustable binder to both the carrier and to the powder. The energy irradiated onto the adjustable binder may be electrical energy, thermal energy, electromagnetic energy, or mechanical energy.

In various implementations, the adjustable binder and the primary binder may be deposited from the same multi-material printhead, or each of the adjustable binder and the primary binder may be deposited from a separate printhead. In either case, alignment of the primary binder and of the adjustable binder position may be ensured by any one of several alignment strategies and systems configured to maintain a precise location of the substrate upon which the adjustable binder is deposited and to move the pattern into alignment with the known position of the primary binder print head.

In various implementations, the position of the pattern of the adjustable binder may be known by providing encoders configured to read the position of the carrier substrate. Another method of alignment of the adjustable binder to the primary binder print head may use alignment fiducials incorporated in either the adjustable binder pattern or in the substrate on which the adjustable binder is deposited. The position of the fiducials may be detected by sensors in known positions relative to the primary binder print head, and the location of the adjustable binder may be adjusted to precise alignment with the primary binder print head based on the location data from the sensors. Other methods of alignment may also be utilized.

Various implementations include saturating a thin layer of powder from both surfaces, i.e., upper surface and lower surface, of the powder layer with deposits of binder. The binder at the lower surface may be an adjustable binder, and the binder at the upper surface may be a primary binder. The adjustable binder and the primary binder may be different or the same. Saturating the thin layer of powder with the binders may be performed via a jetted binder-based printer. The surface of the deposited powder layer that is in contact with a carrier substrate may be treated with a material that may adjust the adhesion of the powder layer to the carrier substrate, or the adhesion of the powder layer to the binders. Individual steps of the pattern generation process may be addressed with more precision to select appropriate agents for each step. For example, the adjustable binder may be selected to maintain the position of the powder as deposited thereon while increasing a difference in adhesion between a powder with a primary binder and a powder without the primary binder, which facilitates the removal of the powder that is not intended to remain with the printed object. In other words, the adjustable binder makes it easy to remove powder that is not designed to be printed on the carrier substrate. The selection of the adjustable binder may also improve the transfer of the resulting printed object from the carrier substrate to, e.g., a build station.

At S150, a curing process may be applied to the deposited printed layer in order to rapidly dry the printed layer. For example, both the adjustable binder and the primary binder may be cured and set by applying an energy source such as, e.g., ultraviolet (UV), infra-red (IR) or microwave radiation, or by applying particles such as electrons or chemical catalysts. Once the curing step is complete, the powder that is not exposed to the jetted binders may be removed at S160. Accordingly, any loose powder may be removed by, e.g., using a mechanical disrupter, an air knife, a vacuum port, and the like. Once the unexposed powder is removed at S160, the printed layer is transported to a build station at S170, where it is transferred to a stack of previously printed layers or, for the first layer printed, begins a new stack on the build station. This process may be repeated until all layers of the desired printed part have been transferred to the build station at S170. Once the completed part is assembled on the build plate, the completed part is removed from the build plate at S180, and is placed in a furnace for sintering or other maturation step such as, e.g., a polymerization step by application of heat or other energy source, at S190.

Figure 2:
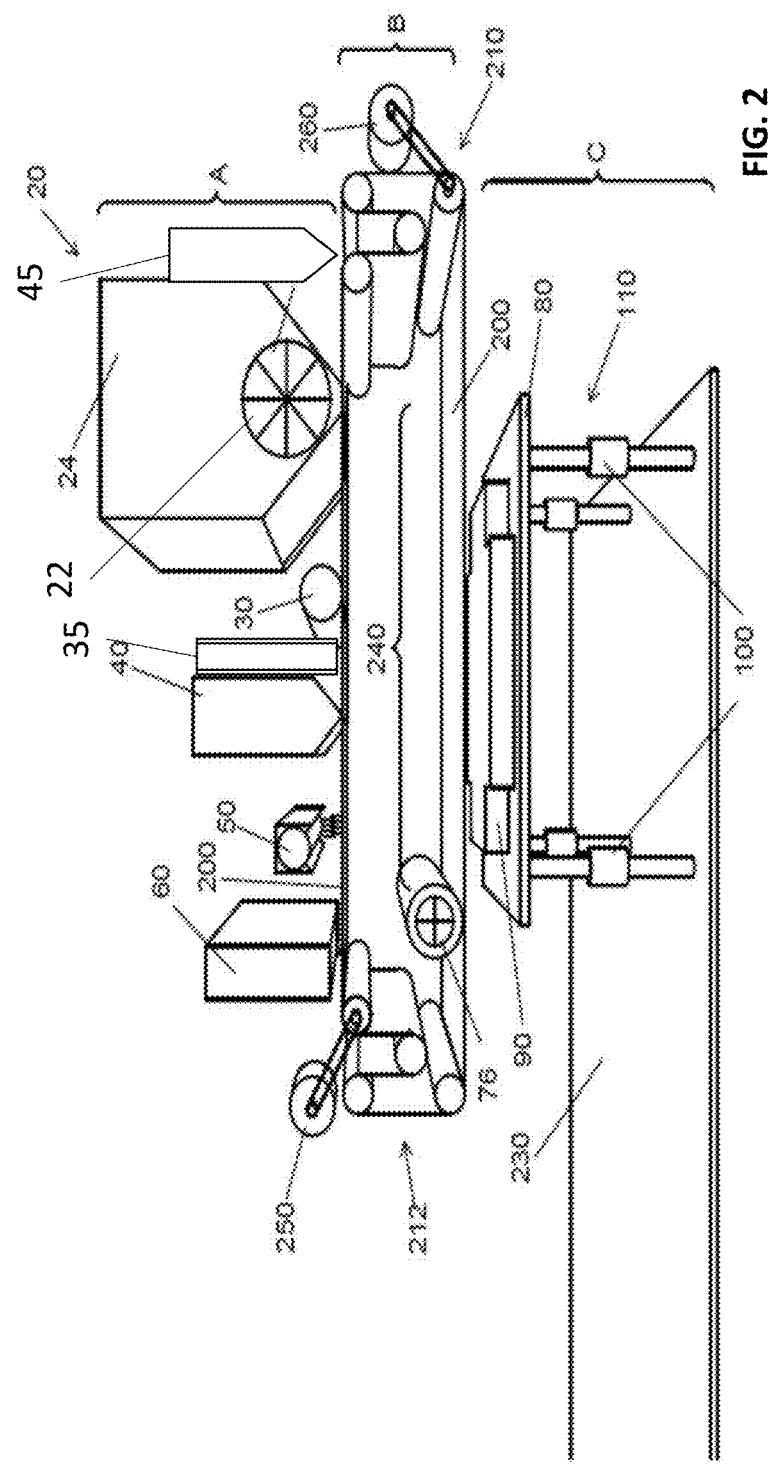
FIG. 2 is an illustration of a 3D jetted binder printer, according to various implementations.

FIG. 2 illustrates some of the basic components of a 3D printer system. For simplicity only one of a plurality of printer modules A and transfer modules B are represented in FIG. 2. FIG. 2 further illustrates a possible relationship between printer module A, transfer module B and assembly apparatus C.

Jetted Binder Printer Module

In various implementations printer module A of FIG. 2 is represented as a jetted binder printer module and includes components to create a printed object from a powdered material, conforming to a desired physical specification. A jetted binder printer module may create a printed object on a carrier substrate 200 of transfer module B.

Adjustable Binder

In various implementations, a dedicated adjustable binder printer 45 may be provided, upstream in the direction of travel from dispensing module or device 20, i.e., ahead of the powder dispensing module or device 20 on the carrier substrate 200 in a longitudinal direction of movement of the carrier substrate 200. In this case, the carrier substrate 200 may move in only the direction of travel indicated in FIG. 2 as going from right to left. In this implementation, adjustable binder printer 45 may deposit the adjustable binder on the carrier substrate 200 in a desired pattern before the carrier substrate 200 moves the adjustable binder pattern under the dispensing module or device 20 where fluidized powder may be dispensed over the adjustable binder pattern. From there, the carrier substrate 200 may transport the adjustable binder pattern having the flowable powder thereon through the compaction module (also referred to as compactor device or the conditioning device) 30 to compact the flowable powder and adjustable binder to a desired density. The carrier substrate 200 may then transport the adjustable binder/flowable powder structure to the alignment module (also referred to as alignment device or alignment sensor) 35 so that the adjustable binder/flowable powder structure may be aligned such that primary binder printer 40 may deposit primary binder in precise alignment with the pattern of adjustable binder in the adjustable binder/flowable powder structure. Accordingly, the adjustable binder is deposited on the carrier substrate 200, and the carrier substrate 200 proceeds to the powder deposition recoating and conditioning steps prior to arriving to the location of the primary binder printer 40 where the primary binder is deposited to match the exact X/Y pattern of the adjustable binder but on the opposite surface of the deposited powder. Thus, the deposited powder is wetted on a first surface by the adjustable binder, and subsequently on a second surface by the primary binder. The total amount of binder may be determined to be sufficient to fix most or all of the powder in the proper position without forming a film covering either the first surface or the second surface of the powder.

In one implementation, for each powder, the relative volumetric concentration and wetting properties of the powder, as recoated, may be known. Based on the relative volumetric concentration and wetting properties of the powder, the volume of adjustable binder that may fill and wet the powder to desired levels may be calculated. As an example of such calculation, the absolute volume of powder to be incorporated in a printed object may be known, and the density to which the powder is to be compacted by the compaction module may also be known, from which the open volume in the compacted powder may be calculated. If the objective is to wet 50% of the powder with adjustable binder, then the adjustable binder print head may be controlled to deposit adjustable binder in an amount equal to 50% of the projected open volume of the compacted powder, in a uniform layer. A single print head, with capability to deposit both the adjustable binder and the primary binder, may be used. For example, the carrier substrate 200 may travel first to the binder deposition location at the adjustable binder printer 45 where the adjustable binder capability is used to deposit a pattern of adjustable binder, before the carrier substrate 200 travels to the powder dispensing module or device 20 to have powder deposited over the adjustable binder, recoated and conditioned. Finally, the carrier substrate 200 may return to the binder deposition location at the adjustable binder printer 45, where instead of the adjustable binder, the primary binder may be deposited on the powder and adjusted so that the primary binder, as it is absorbed by the powder, effectively creates the desired pattern of powder wetted by the adjustable binder. Accordingly, the primary binder may be substantially prevented from spreading, or wicking out, beyond the powder pattern.

The carrier substrate 200 may remain static, i.e., in a fixed location, through the entire process including the adjustable binder deposition, the powder deposition, the recoating/conditioning, and the primary powder deposition. For example, the adjustable binder deposition device, the powder deposition and recoating device, the conditioning device, and the primary binder deposition device may be moved, in turn, into alignment with the static carrier substrate 200 to deposit the adjustable binder, deposit and recoat powder, condition the powder and to deposit a desired aligned pattern of primary binder to the second side of the powder.

The printer module A may include a dispensing module or device 20 at a distal end thereof. Herein, dispensing device and dispensing module are used interchangeably. The dispensing module or device 20 may simply be a dispenser configured to dispense fluidized material. The dispensing module or device 20 may include a materials storage device 24 and a dispensing controller 22. The dispensing controller 22 may be configured to meter a desired amount of fluidized material onto a carrier substrate 200. The dispensing controller 22 may also be configured to precisely control the uniformity of the deposited fluidized material. The dispensing module may include a roller to spread the fluidized particles or powder on the carrier substrate. In some implementations, the dispensing device 20 may include a plurality of material storage devices 24.

Also as part of the printer module A, a compaction device 30 may be provided. The compaction device 30 is sometimes referred to as a compaction module 30. The compaction device 30 is positioned downstream from the dispensing module along the direction of travel. In some implementations, the compaction device 30 may include a roller, made up of a hardened metal material designed as a cylindrical tube. In other implementations, the compaction device 30 may include a compliant pressure cuff, or another device configured to apply a controlled pressure orthogonal to the plane of the deposited fluidized material and the carrier substrate 200. The compaction device 30 may also include a settling device configured to provide vibration. The vibration of the compaction device 30 may improve the distribution and compaction of the fluidized material. In some implementations, the compaction device 30 may be configured to compact a fluidized material to a high density of at least 40% of the theoretical density of the fluidized material.

Printing Device

In various implementations, near the distal end of the carrier substrate 200, a primary binder printer 40 may be included. The binder printer may be positioned downstream from the compaction module along the direction of travel of the carrier substrate 200. The primary binder printer 40 may be configured to deposit a liquid binding material to fix a desired pattern into a fluidized material. The precise pattern may be fixed into the fluidized material by binding the fluidized material into a connected and robust mass. In some implementations, the primary binder printer 40 may be an ink jet type print head under direct control of a computer system as described below in FIGS. 4-7. The computer system may be instructed using a set of patterning instructions, for instance a desired CAD (computer aided design) program.

The primary binder printer 40 may include an ink jet type print head with jetting nozzles spanning the width of the carrier substrate 200. The ink jet type print heads may also be provisioned at a sufficient density to achieve a desired print resolution. The ink jet type print head may be fixed in position and the functioning of each jetting nozzle may be coordinated with the movement of the carrier substrate 200 to create the desired pattern in the fluidized material. Movement of carrier substrate 200 relative to primary binder printer 40 may be implemented by proximal buffer 212 and transfer drive motor 250. Additional buffers may be positioned between proximal buffer 212 and distal buffer 210, to more precisely control the interaction between the developing 3D printed object and any of the components of the jetted binder printer module.

The primary binder printer 40 may include one or more commercially available print heads. For example, the primary binder printer 40 may include an array of print heads with a wide range of properties to accommodate an anticipated range of requirements. In an implementation, the primary binder printer 40 may deliver a measured and adjustable volume of binder to a target voxel of the printed object with a pulse of the print head. The primary binder printer 40 may deliver one or more measured volume to each voxel under control of the computer system.

Alignment Device

In various implementations, the printer module A includes an alignment device 35 (also referred to as alignment sensor) which provides the ability of carrier substrate to move in two directions, i.e., two directions X-Y that are parallel to the longitudinal plane of the carrier substrate 200. The alignment device 35 may allow the primary binder printer 40 to dispense an adjustable binder pattern. The alignment device 35 may also allow the primary binder printer 40 to move against the direction of travel to have fluidized powder dispensed from dispensing module or device 20 into the adjustable binder pattern. The alignment device 35 may also allow the primary binder printer 40 to reverse the direction of travel to go through compaction device 30, under alignment device 35 and on to primary binder printer 40 where the binder printer will dispense the primary binder. Specifically, the alignment device or sensor determines the exact position of the adjustable binder/powder object so that an alignment actuator can adjust the relationship between the binder/powder object and the printhead such that the printhead can deposit the primary binder in a pattern exactly as desired in relation to the adjustable binder/powder object. The adjustment of the relative relationship between the printhead and the adjustable binder/powder object may be facilitated in the direction parallel to the direction of travel, by action of the proximal buffer 212, the distal buffer 210 and the transfer drive motor 250. Adjustments in the direction orthogonal to the direction of travel may be facilitated by an actuator configured to drive the printhead precisely, as directed by the computer system, in a direction that is orthogonal to the direction of travel, or by actuators that are configured to drive the carrier substrate 200 as directed by the computer system, in a direction that is orthogonal to the direction of travel.

In various implementations, the alignment sensor 35 may include sensors configured to precisely determine the location of alignment fiducial marks 204 deposited with or in the adjustable binder/powder object. When the location of the alignment fiducial marks 204 relative to the printhead is precisely known, and the relationship of the alignment fiducial marks 204 is precisely known relative to the rest of the adjustable binder/powder object, the computer system may calculate the location adjustment needed to allow precise jetting of the primary binder on the adjustable binder/powder object.

Fixing Device

In various implementations, the inkjet printer may also include, near the center of the carrier substrate 200, a fixing device 50. The fixing device 50 is positioned downstream from the binder printer along the direction of travel of the carrier substrate 200. The fixing device 50 may be configured to solidify the liquid binding material, thus fixing the fluidized material exposed to the liquid binding material in a robust solid pattern. The fixing device 50 may be a source of radiant energy that may interact with the liquid binding material to cause it to become solid. In some implementations, the radiant energy may be IR radiation, UV radiation, electron beam, or other known radiation types. Alternatively, the fixing device 50 may include a heat source. It should be understood that the fixing device 50 may not be limited to the disclosed radiation types, as this list is presented for exemplary implementations and not intended to be exhaustive. Alternatively, the fixing device 50 may include a device for dispersing a reactive agent. The reactive agent may be configured to react with the liquid binding material and the fluidized material to convert the fluidized material to a robust mass.

Fluidized Material Removal Device

In various implementations, the inkjet printer may also include a fluidized materials removal device 60 further downstream, relatively to movement of the carrier substrate 200, from the fixing device 50. The fluidized materials removal device 60 is sometimes referred to as a material removal module. The material removal module is positioned downstream from the fixing device 50 along the direction of travel. The fluidized materials removal device 60 may be configured to remove most or all of the fluidized material deposited and compacted onto the carrier substrate 200. The fluidized materials removal device 60 may remove the fluidized material deposited and compacted onto the carrier substrate, but not fixed in place by the liquid binder material.

Transfer Module

In addition to carrier substrate 200, transfer module B may include one or more buffers 212, 210 and a transfer device 76. Carrier substrate 200 may include an endless loop (endless belt) of mechanically stable material such as, but not limited to, a steel alloy, a copper alloy or a polymeric material. Carrier substrate 200 may also include a mechanically stable material coated with a material to control adhesion of printed objects to the carrier substrate 200. The adhesion control material coated on carrier substrate 200 may be chosen to control the adhesion of printed material within a desired range for the 3D printed material of the current printed object. The adhesion control material may include for example, a silicone material, a fluoropolymer material, or a thin film metal such as gold.

As discussed above, each multi-method printer system may be provided with a plurality of transfer modules B. In one implementation, one transfer module B may be provided in communication with each one of a plurality of printer modules A. Transfer module B is positioned downstream from the material removal module along the direction of travel. A transfer module B may provide a substrate for the creation of a printed object and cause the transfer of a printed object from that substrate (carrier substrate 200) to assembly apparatus C. As shown in FIG. 2, the transfer module B includes a carrier substrate 200, one or more buffers 210 and/or 212, one or more transfer drive motors 250, 260, and a transfer area (also referred to as transfer zone) 240. In some implementations, the proximal buffer 212 may be provided between fluidized materials removal device 60 and transfer area 240 in order to coordinate the residence time of a 3D printed object relative to transfer area 240 with the components of jetted binder printer.

In an implementation, carrier substrate 200 may include a length of flexible material that may be scaled such that its width is equal to or wider than the build plate 80. The material of carrier substrate 200 may be or include, but is not limited to, a steel alloy or a polymeric material such as polyester or polytetrafluoroethylene, or a composite material. The surface of the carrier substrate 200 may be chosen to control the adhesion between carrier substrate 200 and the materials to be printed by the associated printer module. In one implementation, carrier substrate 200 may include a loop of material that may traverse transfer module B from a distal buffer 210 through a proximal buffer 212 and back through a transfer device 76 to a proximal buffer 212.

In various implementations, carrier substrate 200 may be moved by transfer drive motor 250 and by transfer drive motor 260. Carrier substrate 200 may also be provided with additional devices for controlling the movement of carrier substrate 200 in compliance with the requirements of the individual steps of printed object formation and transfer to build station 110. Transfer device 76 may be implemented downstream, relative to the progressive movement of carrier substrate 200, from the fluidized materials removal device 60. Movement of a 3D printed object on carrier substrate 200 through transfer area 240 may be coordinated by distal buffer 210 and transfer drive motor 260, which may be controlled by the computer system of FIGS. 4 and 5.

Assembly Apparatus

Figure 3:
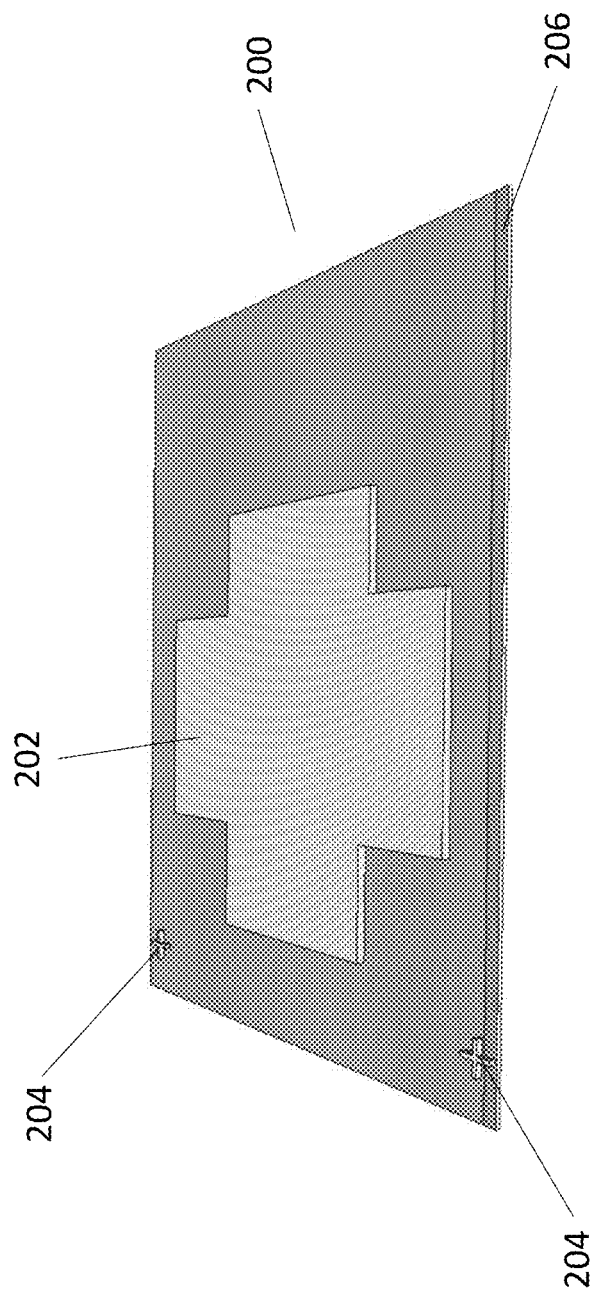
FIG. 3 is an illustration of a carrier substrate, according to various implementations.

Assembly apparatus C, a portion of which is illustrated in FIG. 3, may include a X-Y positioner device 230 and a build station 110. Build station 110 may include a build plate 80. A Z axis positioner device 100 (vertical positioner) may be provided which may adjust the vertical position of build plate 80 to maintain the level of the top of previously transferred printed objects 90 at a desired vertical position to facilitate proper transfer of a printed object to build plate 80 or the top of a stack of previously transferred printed objects 90. The completed assembly of the patterned single-layer objects on the build plate is fused together under conditions suitable for the materials involved.

FIG. 3 is an illustration of a carrier substrate 200, according to various implementations. Precise alignment of the primary binder pattern with adjustable binder pattern may be accomplished by incorporating one or more alignment fiducial marks 204 in the adjustable binder pattern shown in FIG. 3. The alignment device 35 described above with respect to FIG. 2 may be in a known relation to the primary binder printer 40 and may sense the location of alignment fiducial marks 204. From the known locations of alignment fiducial marks 204 and the relationship between primary binder printer 40 and alignment device 35, the precise locations of all pixels comprising adjustable binder pattern 202 may be calculated and used to print the desired pattern of primary binder over the adjustable binder pattern. The primary binder pattern may match the adjustable binder pattern 202 exactly or the primary binder pattern may be adjusted in a desired way to compensate features of the adjustable binder/flowable powder structure. In some implementations, alignment fiducial marks may be incorporated in the active portion of adjustable binder pattern 202.

In various implementations, the alignment device 35 discussed above with respect to FIG. 2 may sense the precise location of alignment fiducial marks 204 using sensing technology based on, but not limited to, electromagnetic radiation in the visible, infrared and/or ultraviolet spectrum, magnetic detection, capacitive sensing, or ultrasonic sensing.

In another implementation, alignment of the adjustable binder pattern and the primary binder pattern may be accomplished by precisely aligning the primary binder printer to the adjustable binder printer relatively to an edge of carrier substrate 200 and separated by, e.g., a known distance. In this implementation, an encoder 206 capable of a desired precision may be incorporated in the carrier substrate or in a system providing locomotion in the direction of travel, or in a sensor precisely sensing the movement of carrier substrate 200 in the direction of travel. With the location of the adjustable binder pattern relative to an edge of the carrier substrate 200, the adjusted pattern of primary binder may be precisely applied by indexing carrier substrate 200 by the distance separating the adjustable binder printer 45 and the primary binder printer 40.

In another implementation, alignment of the adjustable binder pattern and the primary binder pattern may be accomplished by providing encoders that sense both the movement of carrier substrate 200 parallel to the direction of travel and orthogonal to the directions of travel. Knowing the precise position of carrier substrate 200 when the adjustable binder was printed and the precise relative location of adjustable binder printer 45 to primary binder printer 40 allows the adjustable binder pattern on carrier substrate 200 to be moved to a location where the adjusted primary binder pattern may be calculated and printed by primary binder printer 40.

Figure 4:
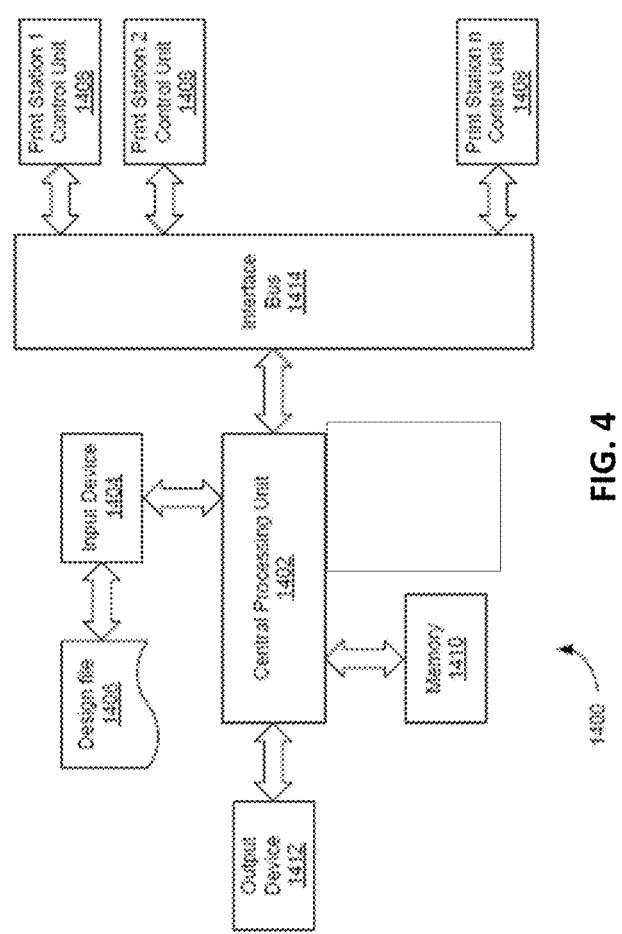
FIG. 4 is a diagram of a computer system configured to control a 3D jetted binder printer, according to various implementations.

FIG. 4 is a diagram of a computer system configured to control a 3D inkjet printer, according to various implementations. Computer system 1400 for controlling the 3D inkjet printer of FIG. 2 is illustrated in FIG. 4. Central processing unit (CPU) 1402 communicates with input device 1404, which may be supplied with a design file 1406. In some implementations, a user may create design file 1406 using CAD software or the like, either on computer system 1400 or on another computer. In other implementations, a user may receive a design file from a file repository, such as Thingiverse, Pinshape, or other file-sharing sites, or from a commercial vendor of 3D designs. CPU 1402 may store design file 1406 or intermediate calculations for control of the print station control units 1408 in memory 1410 and may communicate with the user via output device 1412. CPU 1402 may communicate through interface bus 1414 with a plurality of print station control units 1408 to control dispensing of ink from inkjet print heads as discussed above and other functions of the print station control units 1408.

Figure 5:
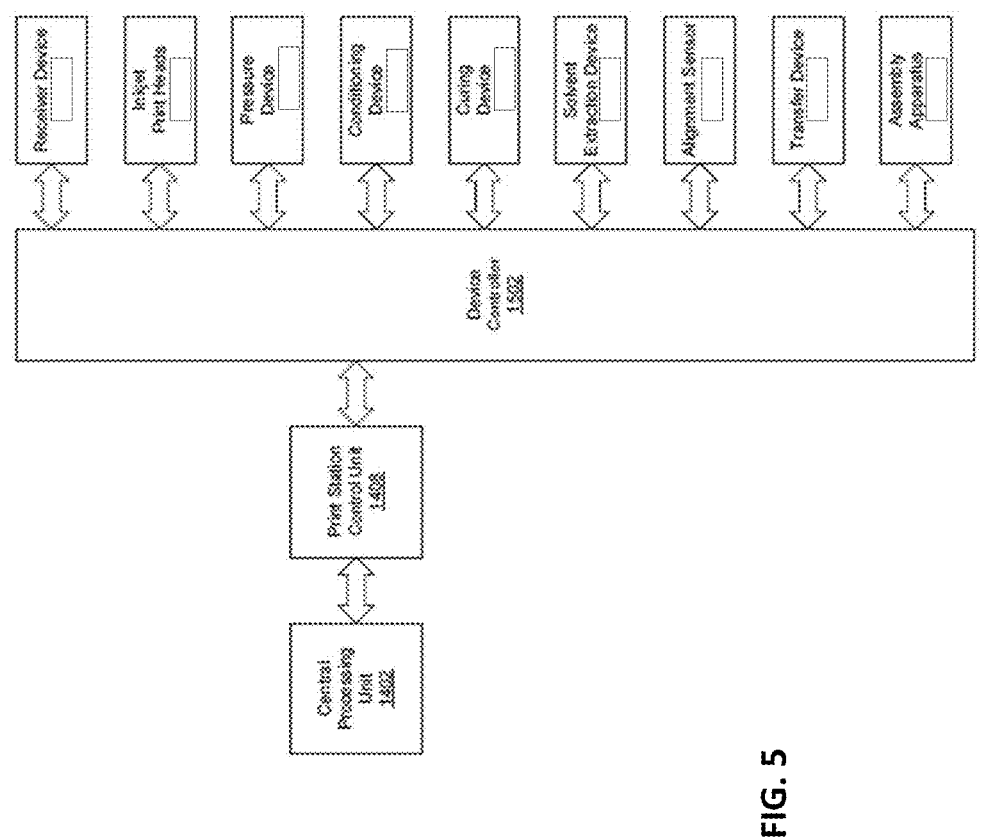
FIG. 5 is a schematic of a print station controller for use with a 3D jetted binder printer, according to various implementations.

FIG. 5 is a schematic of a print station controller for use with a 3D inkjet printer, according to various implementations. As shown in FIG. 5, print station control units 1408 may communicate via a device controller 1502 with the various devices and modules discussed above, controlling each of, or at least one of, these devices or modules in order to deposit ink as specified by design file 1406 as interpreted by CPU 1402. CPU 1402 may receive state information and sensor information, and may send control signals, to any of these devices using control signaling systems that are known in the art, in order to facilitate printing as described herein.

Figure 6:
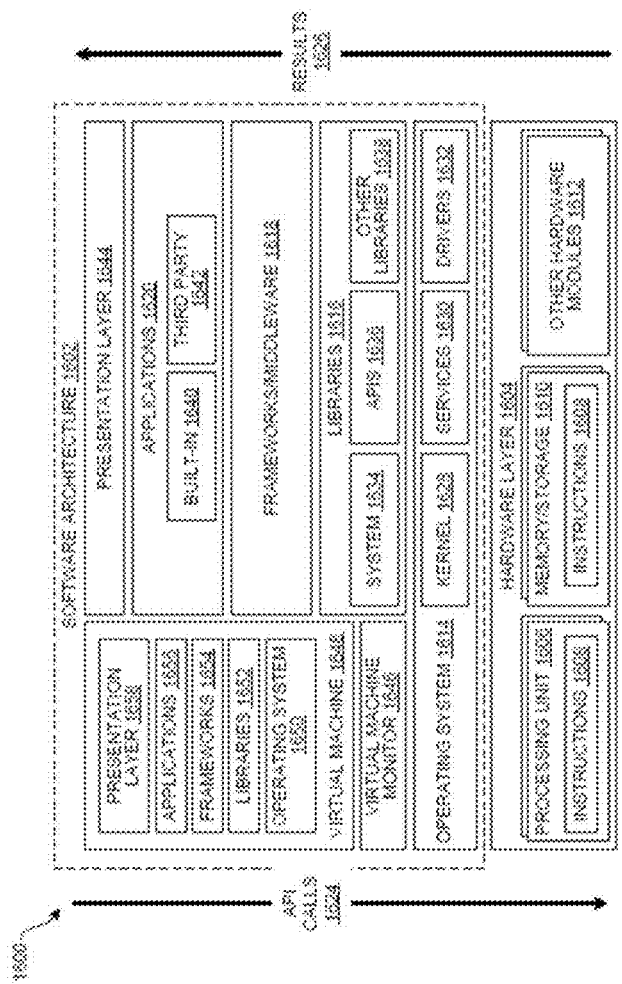
FIG. 6 is a block diagram of an example computing device configured to provide implementations of the systems and methods described herein.

FIG. 6 is a block diagram of an example computing device configured to provide implementations of the systems and methods described herein. FIG. 6 is a block diagram 1600 illustrating an example software architecture 1602, various portions of which may be used in conjunction with various hardware architectures herein described, which may implement any of the above-described features. FIG. 6 is a non-limiting example of a software architecture and it will be appreciated that many other architectures may be implemented to facilitate the functionality described herein. The software architecture 1602 may execute on hardware such as the central processing unit 1402 that may include, among other things, document storage, processors, memory, and input/output (I/O) components. A representative hardware layer 1604 is illustrated and may represent, for example, the devices described herein. The representative hardware layer 1604 includes a processing unit 1606 and associated executable instructions 1608. The executable instructions 1608 represent executable instructions of the software architecture 1602, including implementation of the methods, modules and so forth described herein. The hardware layer 1604 also includes a memory/storage 1610, which also includes the executable instructions 1608 and accompanying data. The hardware layer 1604 may also include other hardware modules 1612. Instructions 1608 held by processing unit 1608 may be portions of instructions 1608 held by the memory/storage 1610.

The example software architecture 1602 may be conceptualized as layers, each providing various functionality. For example, the software architecture 1602 may include layers and components such as an operating system (OS) 1614, libraries 1616, frameworks 1618, applications 1620, and a presentation layer 1644. Operationally, the applications 1620 and/or other components within the layers may invoke API calls 1624 to other layers and receive corresponding results 1626. The layers illustrated are representative in nature and other software architectures may include additional or different layers. For example, some mobile or special purpose operating systems may not provide the frameworks/middleware 1618.

The OS 1614 may manage hardware resources and provide common services. The OS 1614 may include, for example, a kernel 1628, services 1630, and drivers 1632. The kernel 1628 may act as an abstraction layer between the hardware layer 1604 and other software layers. For example, the kernel 1628 may be responsible for memory management, processor management (for example, scheduling), component management, networking, security settings, and so on. The services 1630 may provide other common services for the other software layers. The drivers 1632 may be responsible for controlling or interfacing with the underlying hardware layer 1604. For instance, the drivers 1632 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 1616 may provide a common infrastructure that may be used by the applications 1620 and/or other components and/or layers. The libraries 1616 typically provide functionality for use by other software modules to perform tasks, rather than rather than interacting directly with the OS 1614. The libraries 1616 may include system libraries 1634 (for example, C standard library) that may provide functions such as memory allocation, string manipulation, file operations. In addition, the libraries 1616 may include API libraries 1636 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 1616 may also include a wide variety of other libraries 1638 to provide many functions for applications 1620 and other software modules.

The frameworks 1618 (also sometimes referred to as middleware) provide a higher-level common infrastructure that may be used by the applications 1620 and/or other software modules. For example, the frameworks 1618 may provide various graphic user interface (GUI) functions, high-level resource management, or high-level location services. The frameworks 1618 may provide a broad spectrum of other APIs for applications 1620 and/or other software modules.

The applications 1620 include built-in applications 1640 and/or third-party applications 1642. Examples of built-in applications 1640 may include, but are not limited to, a contacts application, a browser application, a location application, a media application, a messaging application, and/or a game application. Third-party applications 1642 may include any applications developed by an entity other than the vendor of the particular platform. The applications 1620 may use functions available via OS 1614, libraries 1616, frameworks 1618, and presentation layer 1644 to create user interfaces to interact with users.

Some software architectures use virtual machines, as illustrated by a virtual machine 1648. The virtual machine 1648 provides an execution environment where applications/modules may execute as if they were executing on a hardware machine. The virtual machine 1648 may be hosted by a host OS (for example, OS 1614) or hypervisor, and may have a virtual machine monitor 1646 which manages operation of the virtual machine 1648 and interoperation with the host operating system. A software architecture, which may be different from software architecture 1602 outside of the virtual machine, executes within the virtual machine 1648 such as an OS 1650, libraries 1652, frameworks 1654, applications 1656, and/or a presentation layer 1658.

Figure 7:
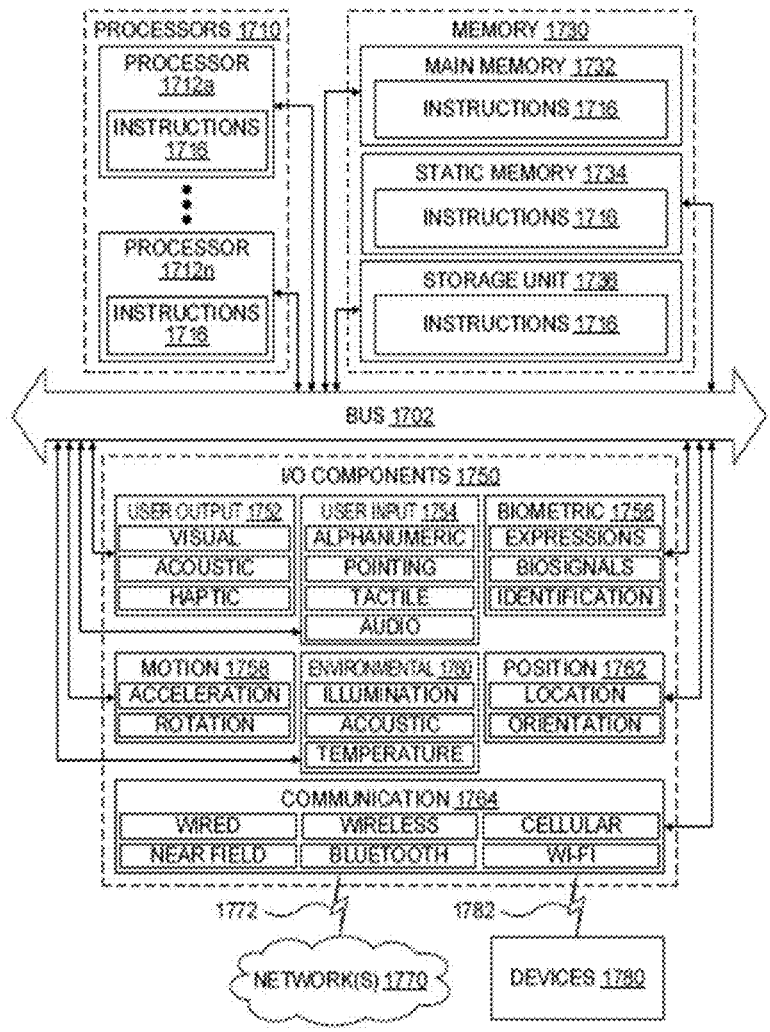
FIG. 7 is a block diagram illustrating components of an example machine configured to read instructions from a machine-readable medium.

FIG. 7 is a block diagram illustrating components of an example machine 1700 configured to read instructions from a machine-readable medium (for example, a machine-readable storage medium) and perform any of the features described herein. The example machine 1700 is in a form of a computer system, within which instructions 1716 (for example, in the form of software components) for causing the machine 1700 to perform any of the features described herein may be executed. As such, the instructions 1716 may be used to implement modules or components described herein. The instructions 1716 cause unprogrammed and/or unconfigured machine 1700 to operate as a particular machine configured to carry out the described features. The machine 1700 may be configured to operate as a standalone device or may be coupled (for example, networked) to other machines. In a networked deployment, the machine 1700 may operate in the capacity of a server machine or a client machine in a server-client network environment, or as a node in a peer-to-peer or distributed network environment. Machine 1700 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 1700 is illustrated, the term "machine" includes a collection of machines that individually or jointly execute the instructions 1716.

The machine 1700 may include processors 1710, memory 1730, and I/O components 1750, which may be communicatively coupled via, for example, a bus 1702. The bus 1702 may include multiple buses coupling various elements of machine 1700 via various bus technologies and protocols. In an example, the processors 1710 (including, for example, a central processing unit (CPU), a graphics processing unit (GPU), a digital signal processor (DSP), an ASIC, or a suitable combination thereof) may include one or more processors 1712a to 1712n that may execute the instructions 1716 and process data. In some examples, one or more processors 1710 may execute instructions provided or identified by one or more other processors 1710. The term "processor" includes a multi-core processor including cores that may execute instructions contemporaneously. Although FIG. 7 shows multiple processors, the machine 1700 may include a single processor with a single core, a single processor with multiple cores (for example, a multi-core processor), multiple processors each with a single core, multiple processors each with multiple cores, or any combination thereof. In some examples, the machine 1700 may include multiple processors distributed among multiple machines.

The memory/storage 1730 may include a main memory 1732, a static memory 1734, or other memory, and a storage unit 1736, both accessible to the processors 1710 such as via the bus 1702. The storage unit 1736 and memory 1732, 1734 store instructions 1716 embodying any one or more of the functions described herein. The memory/storage 1730 may also store temporary, intermediate, and/or long-term data for processors 1710. The instructions 1716 may also reside, completely or partially, within the memory 1732, 1734, within the storage unit 1736, within at least one of the processors 1710 (for example, within a command buffer or cache memory), within memory at least one of I/O components 1750, or any suitable combination thereof, during execution thereof. Accordingly, the memory 1732, 1734, the storage unit 1736, memory in processors 1710, and memory in I/O components 1750 are examples of machine-readable media.

As used herein, "machine-readable medium" refers to a device able to temporarily or permanently store instructions and data that cause machine 1700 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 1716) for execution by a machine 1700 such that the instructions, when executed by one or more processors 1710 of the machine 1700, cause the machine 1700 to perform and one or more of the features described herein. Accordingly, a "machine-readable medium" may refer to a single storage device, as well as "cloud-based" storage systems or storage networks that include multiple storage apparatus or devices.

The I/O components 1750 may include a wide variety of hardware components adapted to receive input, provide output, produce output, transmit information, exchange information, capture measurements, and so on. The specific I/O components 1750 included in a particular machine will depend on the type and/or function of the machine. For example, mobile devices such as mobile phones may include a touch input device, whereas a headless server or IoT device may not include such a touch input device. The particular examples of I/O components illustrated in FIG. 7 are in no way limiting, and other types of components may be included in machine 1700. The grouping of I/O components 1750 are merely for simplifying this discussion, and the grouping is in no way limiting. In various examples, the I/O components 1750 may include user output components 1752 and user input components 1754. User output components 1752 may include, for example, display components for displaying information (for example, a liquid crystal display (LCD) or a projector), acoustic components (for example, speakers), haptic components (for example, a vibratory motor or force-feedback device), and/or other signal generators. User input components 1754 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 1750 may include biometric components 1756, motion components 1758, environmental components 1760, and/or position components 1762, among a wide array of other possible sensor components. The biometric components 1756 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The motion components may include, for example, acceleration and/or rotation sensors for various components of the 3D printer. The environmental components may include, for example, light sensors (for example, photodiodes, photoresistors, or phototransistors), acoustic sensors (for example, piezoelectric sensors or acoustic wave sensors), or temperature sensors (for example, thermocouples or thermistors), which may sense environmental conditions for various locations in the 3D printer. The position components 1762 may include, for example, location sensors (for example, a Global Position System (GPS) receiver), altitude sensors (for example, an air pressure sensor from which altitude may be derived), and/or orientation sensors (for example, magnetometers).

The I/O components 1750 may include communication components 1764, implementing a wide variety of technologies operable to couple the machine 1304 to network(s) 1770 and/or device(s) 1780 via respective communicative couplings 1772 and 1782. The communication components 1764 may include one or more network interface components or other suitable devices to interface with the network(s) 1770. The communication components 1764 may include, for example, components adapted to provide wired communication, wireless communication, cellular communication, Near Field Communication (NFC), Bluetooth communication, Wi-Fi, and/or communication via other modalities. The device(s) 1780 may include other machines or various peripheral devices (for example, coupled via USB).

In some examples, the communication components 1764 may detect identifiers or include components adapted to detect identifiers. For example, the communication components 1764 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 1762, such as, but not limited to, geo-location via Internet Protocol (IP) address, location via Wi-Fi, cellular, NFC, Bluetooth, or other wireless station identification and/or signal triangulation.

In the following, further features, characteristics and advantages of the instant application will be described via the following items:

Item 1: A jetted binder printing system, including a carrier substrate configured to travel along a longitudinal direction thereof, an adjustable binder printer configured to deliver an adjustable binder to the carrier substrate, a dispensing module located downstream from the adjustable binder printer on the longitudinal direction of the carrier substrate, the dispensing module including at least one powder container, the dispensing module being configured to dispense powder onto the carrier substrate, a compaction module located downstream from the dispensing module along the longitudinal direction of the carrier substrate, the compaction module being configured to apply a controlled pressure, in a direction substantially orthogonal to the longitudinal direction of the carrier substrate, to increase a compaction of the dispensed powder to a desired compaction range, and a primary binder printer located downstream from the compaction module along the longitudinal direction of the carrier substrate, the primary binder printer including a print head configured to print a primary binder on the dispensed powder according to a desired pattern, wherein the primary binder is printed on a surface of the powder that is opposite a surface on which the adjustable binder is printed; and wherein the primary binder is printed to coordinate with the pattern of the adjustable binder. For example, the primary binder may be slightly offset with respect to the adjustable binder so as to compensate for any movement in the adjustable binder and/or in the powder, and to compensate for any movement in the primary binder after deposition.

Item 2: The printer of item 1, wherein the adjustable binder is compatible with the primary binder.

Item 3: The printer of item 1 or 2, wherein the adjustable binder is configured to maintain a position of the powder.

Item 4: The printer of any of items 1-3, wherein the adjustable binder is configured to provide adhesion to the powder and to the primary binder.

Item 5: The printer of any of items 1-4, further including a fusion module positioned downstream from the primary binder printer along the longitudinal direction of the carrier substrate, the fusion module including an energy source and being configured to cause selective fusion of the material layer according to the desired pattern, a material removal module positioned downstream from the fusion module along the longitudinal direction of the carrier substrate, the material removal module including a plurality of material removal devices and being configured to remove non-fused portions of the material layer to form one or more patterned single-layer objects, a transfer module located downstream from the material removal module along the longitudinal direction of the carrier substrate, the transfer module configured to transfer the one of the one or more patterned single-layer objects from the carrier substrate to an assembly plate, an assembly station comprising the assembly plate, the patterned single-layer objects being assembled into a stack on the assembly plate according to a desired sequence of objects including the patterned single-layer objects, and a controller to control the desired sequence and desired patterns.

Item 6: The printer of any of items 1-5, wherein the carrier substrate is a belt.

Item 7: The printer of any of items 1-6, wherein the carrier substrate further comprises an adhesion control layer on which the material layer is formed.

Item 8: The printer of any of items 1-7, wherein the dispensing module comprises one or more powder containers configured to contain a fluidized powder in a desired controlled condition.

Item 9: The printer of any of items 1-8, wherein the dispensing module comprises one or more dispensing controllers configured to meter a desired amount of powder dispensed onto the carrier substrate.

Item 10: The printer of any of items 1-9, wherein the dispensing module comprises one or more dispensing rollers configured to spread the powder on the carrier substrate.

Item 11: The printer of any of items 1-10, wherein the compactor module comprises a vibratory energy source to cause settling of the powder.

Item 12: The printer of any of items 1-11, wherein the print head comprises an ink jet print head.

Item 13: The printer of any of items 1-12, wherein the assembly station further including a lateral positioner to laterally displace the assembly plate, and a vertical positioner to vertically displace the assembly plate.

Item 14: The printer of any of items 1-13, wherein the carrier substrate comprises a fiducial marker for each of the patterned single-layer objects; and the assembly station comprises an alignment sensor to align the fiducial markers to the assembly plate.

Item 15: A method of manufacturing a three-dimensional object including dispensing an adjustable binder on a longitudinal surface of a carrier substrate according to a desired pattern, dispensing a powder on the adjustable binder on the carrier substrate, compacting the powder to a desired compaction range, dispensing a primary binder on the compacted powder according to the desired pattern, selectively fusing the compacted powder according to the desired pattern, and removing non-fused portions of the compacted powder to form one of a patterned single-layer object.

Item 16: The method of item 15, further including transferring the patterned single-layer object from the carrier substrate to an assembly plate, and repeating the dispensing the adjustable binder, the dispensing the powder on the adjustable binder, the compacting the powder, the dispensing the primary binder, the selectively fusing the compacted powder and the removing the non-fused portions, to form a patterned multi-layer object.

Item 17: The method of any of items 15-16, wherein the dispensing the adjustable binder comprises defining a position of the powder.

Item 18: The method of any of items 15-17, wherein the printing the powder comprises adhering the powder to the adjustable binder at the defined position.

While various implementations have been described, the description is intended to be exemplary, rather than limiting, and it is understood that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents.

Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that includes the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A method of manufacturing a three-dimensional object comprising:
   dispensing an adjustable binder on a longitudinal surface of a carrier substrate according to a desired pattern;
   dispensing a powder on the adjustable binder on the carrier substrate;
   compacting the powder to a desired compaction range;
   dispensing a primary binder on the compacted powder according to the desired pattern;
   selectively fusing the compacted powder according to the desired pattern; and
   removing non-fused portions of the compacted powder to form one of a patterned single-layer object.

2. The method of claim 1, further comprising:
   transferring the patterned single-layer object from the carrier substrate to an assembly plate; and
   repeating the dispensing the adjustable binder, the dispensing the powder on the adjustable binder, the compacting the powder, the dispensing the primary binder, the selectively fusing the compacted powder and the removing the non-fused portions, to form a patterned multi-layer object.

3. The method of claim 1, wherein the dispensing the adjustable binder comprises defining a position of the powder.

4. The method of claim 3, wherein the dispensing the powder comprises adhering the powder to the adjustable binder at the defined position.

5. The method of claim 1, wherein dispensing the primary binder on the compacted powder comprises dispensing the primary binder on a surface of the compacted powder that is opposite a surface on which the adjustable binder is dispensed.

6. The method of claim 1, wherein dispensing the primary binder on the compacted powder comprises dispensing the primary binder in coordination with the desired pattern of the adjustable binder.

7. The method of claim 1, wherein compacting the powder comprises apply a controlled pressure, in a direction substantially orthogonal to the longitudinal direction of the carrier substrate, to increase a compaction of the dispensed powder to the desired compaction range.

8. The method of claim 1, wherein dispensing the primary binder on the compacted powder comprises fixing a position of the compacted powder.

9. The method of claim 1, wherein dispensing the primary binder on the compacted powder comprises adhering the compacted powder to the primary binder.

10. The method of claim 1, further comprising:
 causing selective fusion of a material layer including the adjustable binder, the powder and the primary binder according to the desired pattern;
 removing non-fused portions of the material layer to form one or more patterned single-layer objects;
 transferring one of the or more patterned single-layer objects from the carrier substrate to an assembly plate; and
 controlling a desired sequence of the single-layer objects and the desired pattern.

11. The method of claim 1, wherein dispensing the powder on the adjustable binder on the carrier substrate comprises dispensing a fluidized powder in a desired controlled condition.

12. The method of claim 1, wherein dispensing the powder on the adjustable binder on the carrier substrate comprises metering a desired amount of powder on the adjustable binder on the carrier substrate.

13. The method of claim 1, wherein dispensing the powder on the adjustable binder on the carrier substrate comprises spreading the powder on the carrier substrate.

14. The method of claim 1, wherein compacting the powder to the desired compaction range comprises applying a vibratory energy source to cause settling of the powder.

* * * * *